T. D. Keith,
Plate Lifter.
No. 97,093.  Patented Nov. 23, 1869.
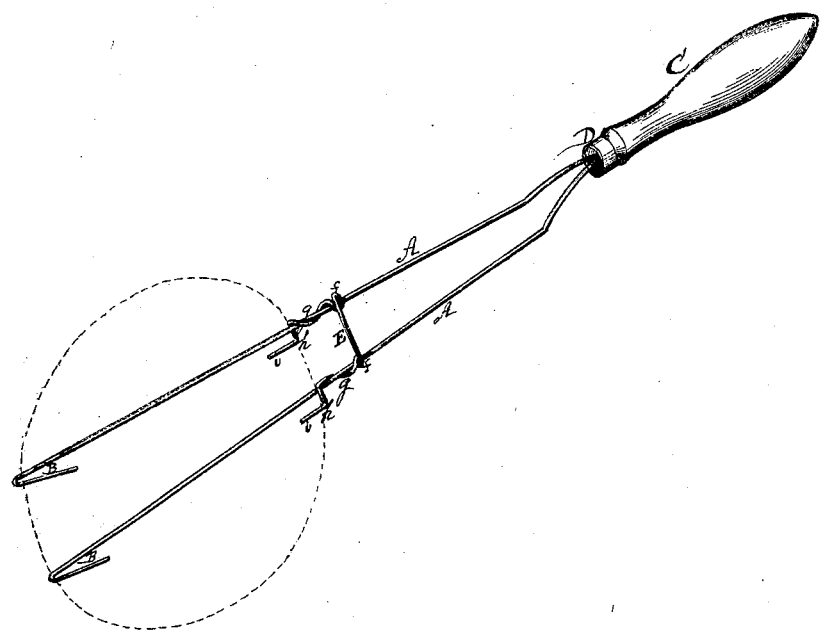
Witnesses:
W. F. Clark
Frank Blockley
Inventor:
T. D. Keith
per Mmmm
Attorneys.

United States Patent Office.

T. D. KEITH, OF MAYVILLE, WISCONSIN.

Letters Patent No. 97,093, dated November 23, 1869.

---

IMPROVED PLATE-LIFTER AND BREAD-TOASTER.

---

The Schedule referred to in these Letters Patent and making part of the same.

---

To all whom it may concern:

Be it known that I, T. D. KEITH, of Mayville, in the county of Dodge and State of Wisconsin, have invented a new and useful Improvement in Combined Plate-Lifter and Bread-Toaster; and I do hereby declare that the following is a full, clear, and exact description thereof, which will enable those skilled in the art to make and use the same, reference being had to the accompanying drawings forming part of this specification.

This invention relates to a new and useful improvement in an article for kitchen-use, designed for lifting plates and toasting slices of bread; and It consists in the use of a slide on two or more long hooks, secured to a handle, and operating as hereinafter more fully described.

A A are two rods, with hooks at their outer ends, as seen at B B, and with their other ends secure in the handle C.

This handle may be made of wood or of any other suitable material, its end being strengthened by a ferrule, as seen at D.

E represents a slide on the rods A A.

It is made of a single piece of wire, so coiled that eyes are formed at the points $f f$, through which the rods A pass.

From the eyes $f$, the ends of the wire are twisted around the rods, as seen at $g g$, and then the ends are bent so as to form right angles, as seen at $h h$.

The extreme ends $i i$, form (with the rods) hooks corresponding in position and action with the hooks B B.

Made of suitable size and strength, any size plate may be lifted thereby, by moving up the slide. Slices of bread for toasting are held in the same manner. The position of the rods is controlled by the eyes $f f$, the distance between the hooks B B being contracted by moving the slide forward, and increased by drawing it back.

The advantages of this simple and cheap contrivance, over the ordinary appliances for the objects intended, are many and obvious, and will be readily understood and appreciated by housekeepers.

Having thus described my invention,

What I claim as new, and desire to secure by Letters Patent, is—

A compound plate-holder and toaster, consisting of rods A A, hooks B B, slide E, and handle C D, each of said parts being constructed and arranged, with respect to the others, in the manner described.

T. D. KEITH.

Witnesses:
E. I. DAHM,
W. A. MANVILLE.